(12) United States Patent
Onozuka et al.

(10) Patent No.: US 7,500,812 B2
(45) Date of Patent: Mar. 10, 2009

(54) METHOD AND PROGRAM FOR CALCULATING MAXIMUM DEPTH OF CUT WITHOUT SELF-EXCITED VIBRATION OF CUTTING TOOL

(75) Inventors: Hideaki Onozuka, Sagamihara (JP); Tomu Kato, Tsuchiura (JP); Koji Utsumi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 47 days.

(21) Appl. No.: 11/698,109

(22) Filed: Jan. 26, 2007

(65) Prior Publication Data

US 2007/0179661 A1 Aug. 2, 2007

(30) Foreign Application Priority Data

Jan. 27, 2006 (JP) ............................. 2006-018749

(51) Int. Cl.
*G06F 19/00* (2006.01)
(52) U.S. Cl. ...................................... 409/132; 700/173
(58) Field of Classification Search ................ 409/131, 409/132; 700/173, 280
See application file for complete search history.

(56) References Cited

U.S. PATENT DOCUMENTS

| | | | | |
|---|---|---|---|---|
| 5,876,155 | A | * 3/1999 | Link et al. | 409/132 |
| 5,920,483 | A | * 7/1999 | Greenwood et al. | 409/132 |
| 7,216,407 | B2 | * 5/2007 | Yonemaru | 409/132 |

* cited by examiner

*Primary Examiner*—Dana Ross
(74) *Attorney, Agent, or Firm*—Antonelli, Terry, Stout & Kraus, LLP.

(57) ABSTRACT

A method for calculating depth of cut without any milling self-excited vibration. An initial value for machining-surface-perpendicular depth of cut is set. A cutting start angle and cutting end angle for a cutting edge is obtained, based on the initial value. A machining-surface-perpendicular depth of cut that causes no self-excited vibration is calculated. The maximum depth of cut that corresponds to the stability limit of a milling self-excited vibration is calculated, by repeating the calculation while modifying the initial value until the difference between the initial value and the calculation result becomes the same as, or smaller than, a given value. As a result, the stability-limit depth of cut is preliminarily analyzed to the milling self-excited vibration in consideration of a pick feed, the gradient angle of a workpiece, and a machining-surface curvature radius, so that man-hours required for creation and modification of NC data can be reduced.

6 Claims, 7 Drawing Sheets

METHOD AND PROGRAM FOR CALCULATING MAXIMUM DEPTH OF CUT WITHOUT SELF-EXCITED VIBRATION OF CUTTING TOOL

The present application is based on and claims priority of Japanese patent application No. 2006-018749 filed on Jan. 27, 2006, the entire contents of which are hereby incorporated by reference.

BACKGROUND OF THE INVENTION

1. Field of the Invention

The present invention relates to a method and a program for calculating the maximum depth of cut without any self-excited vibration, and more particularly, to a method for preliminarily anticipating a stable machining condition when three-dimension-contour machining is performed while a cutting tool is rotatably moved by a machine tool so as to prevent a self-excited vibration that causes tool breakage or deterioration in machining accuracy.

2. Description of the Related Art

In the case of milling by means of a rotating tool, the low rigidity of the tool or a workpiece may cause a relative vibration between the tool and the workpiece. The relative vibration between a tool and a workpiece is caused by a forced vibration or a self-excited vibration.

In the case of the relative vibration due to a forced vibration, the cutting edge of the rotating tool passes through the workpiece, thereby causing milling force acting between the tool and the workpiece; the milling force produces a relative displacement. In this situation, the tool or the workpiece vibrates at a milling frequency determined by the product of the multiplication of the tool rotation speed by the number of the cutting edges; when the vibration is large, noise or the vibration of the machine tool is caused.

In contrast, in the case of the relative vibration due to a self-excited vibration, a vibration is caused at a frequency close to the natural frequency of a mechanical system consisting of a tool, a machine tool, a workpiece, and the like. The relative vibration due to a self-excited vibration has a characteristic that a vibration does not start immediately after the commencement of milling, but with the progress of the milling, the vibration gradually becomes large. In many cases of the relative vibration due to a self-excited vibration, the natural frequency of a mechanical-system is generally several hundreds Hz to several kHz, and the tone of the noise due to the vibration is relatively high.

The self-excited vibration has been modeled through the regeneration theory proposed by Tlusty et al., and a method therefor was established in which numerical-analysis anticipation is performed. The regeneration effect denotes the phenomenon that a tool vibration, produced due to the fluctuation in milling thickness in the case where milling is performed by a cutting edge that passes through a wavefront that has been formed through one-period-previous vibrating milling by the cutting edge, increases with the progress of the milling.

The stability limit of the milling self-excited vibration is determined by the radial depth of cut, axial depth of cut, and the like, among machining conditions. In general, the axial depth of cut that, with the radial depth of cut fixed to a given value, corresponds to the stability limit of a self-excited vibration is referred to as stability-limit depth of cut. By preliminarily anticipating the stability-limit depth of cut so as to create an NC program, modification of the NC program due to the occurrence of a vibration becomes unnecessary, whereby the number of man-hours can significantly be reduced.

SUMMARY OF THE INVENTION

However, a conventional method for analyzing a milling self-excited vibration can be applied only to a case where, as groove milling in the X-Y plane illustrated in FIG. 2, the transport direction for a tool 1 is in a plane that is perpendicular to the rotation axis of the tool 1. In other words, the gradient angle between the rotation axis of the tool 1 and the machining surface of a workpiece 2, the machining-surface curvature radius in the tool rotation plane, and the like are not considered.

In a practical workpiece machining, for example, a method is utilized in which, as illustrated in FIG. 1, the corner portion of a pocket is machined while the tool 1 is moved in a direction approximately the same as the rotation axis of the tool 1; however, in this case, the evaluation on the self-excited vibration has not been carried out yet.

The objective of the present invention is to provide a method and a program, which address the foregoing cases, for calculating the maximum depth of cut without any self-excited vibration.

In the present invention, in order to solve the problem that conventional techniques can be applied only to groove milling in an X-Y plane, stability-limit machining-surface-perpendicular depth of cut is obtained, by utilizing as input values the gradient angle between a machining surface and the rotation axis of a tool, the machining surface curvature radius, the tool radius, the pick feed.

Moreover, the present invention includes a calculation algorithm in which an initial value for the stability-limit machining surface-perpendicular depth of cut is set; based on the initial value, the milling start angle and the milling end angle are obtained so as to calculate the stability-limit depth of cut; and modification of the assumed value is repeated until the difference between the assumed value and the calculated value falls within a given error range.

Still moreover, in calculating the milling start angle and the milling end angle, if the coordinates of a point on a trajectory, in the cutting edge rotation plane, that is drawn by the cutting edge is located not only outside the arc of the unmachined surface, but also outside the arc that is a cutting-edge trajectory in the immediately previous machining, it is determined that the point is being milled, and the milling start angle and the milling end angle can be obtained.

Furthermore, when the pick feed is large, the scallop height increases, whereby, in the following machining, the machining surface-perpendicular depth of cut increases by the volume corresponding to the scallop height, thereby lowering the stability limit; therefore, the difference between the addition of the calculated value for the machining surface-perpendicular depth of cut and the scallop height and the initial value for the machining surface-perpendicular depth of cut is made to fall within a given error range, so that the stability condition in consideration of the scallop height is outputted.

According to the present invention, provision is made for a method for calculating the maximum depth of cut without milling self-excited vibration, in consideration of the gradient angle between the rotation axis of a tool and the machining surface of a workpiece, the machining surface curvature radius in the tool rotation plane, and the like.

BRIEF DESCRIPTION OF THE DRAWING

These and other features, objects and advantages of the present invention will become more apparent from the following description when taken in conjunction with the accompanying drawings wherein.

DETAILED DESCRIPTION OF PREFERRED EMBODIMENTS

The best mode for embodying the present invention will be explained.

A method, which is an example of the present invention, for, in the case of gradient milling, calculating the maximum depth of cut without any milling self-excited vibration will be explained in detail below, with reference to the accompanying drawings.

Figure 1:
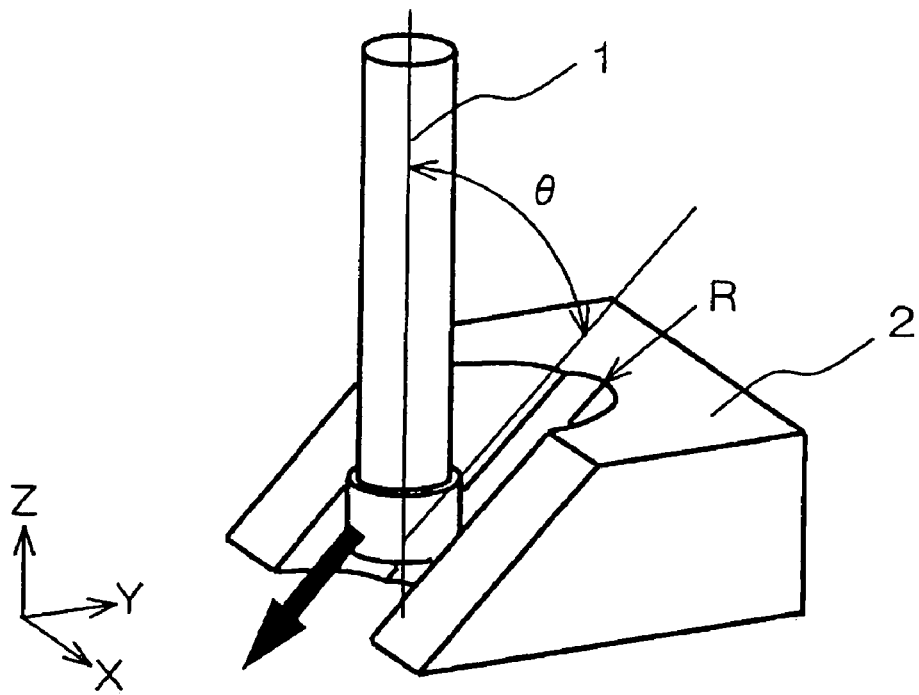
FIG. 1 is an explanatory view for illustrating a milling processing mode according to the present invention.
Figure 2:
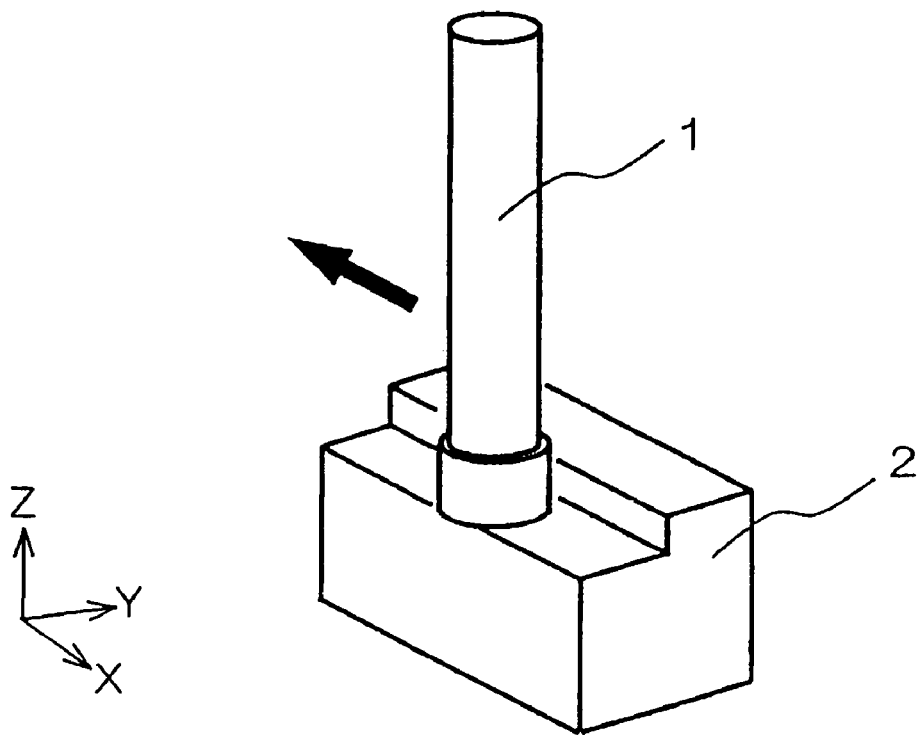
FIG. 2 is an explanatory view for illustrating a milling processing mode according to a conventional technique.
Figure 3:
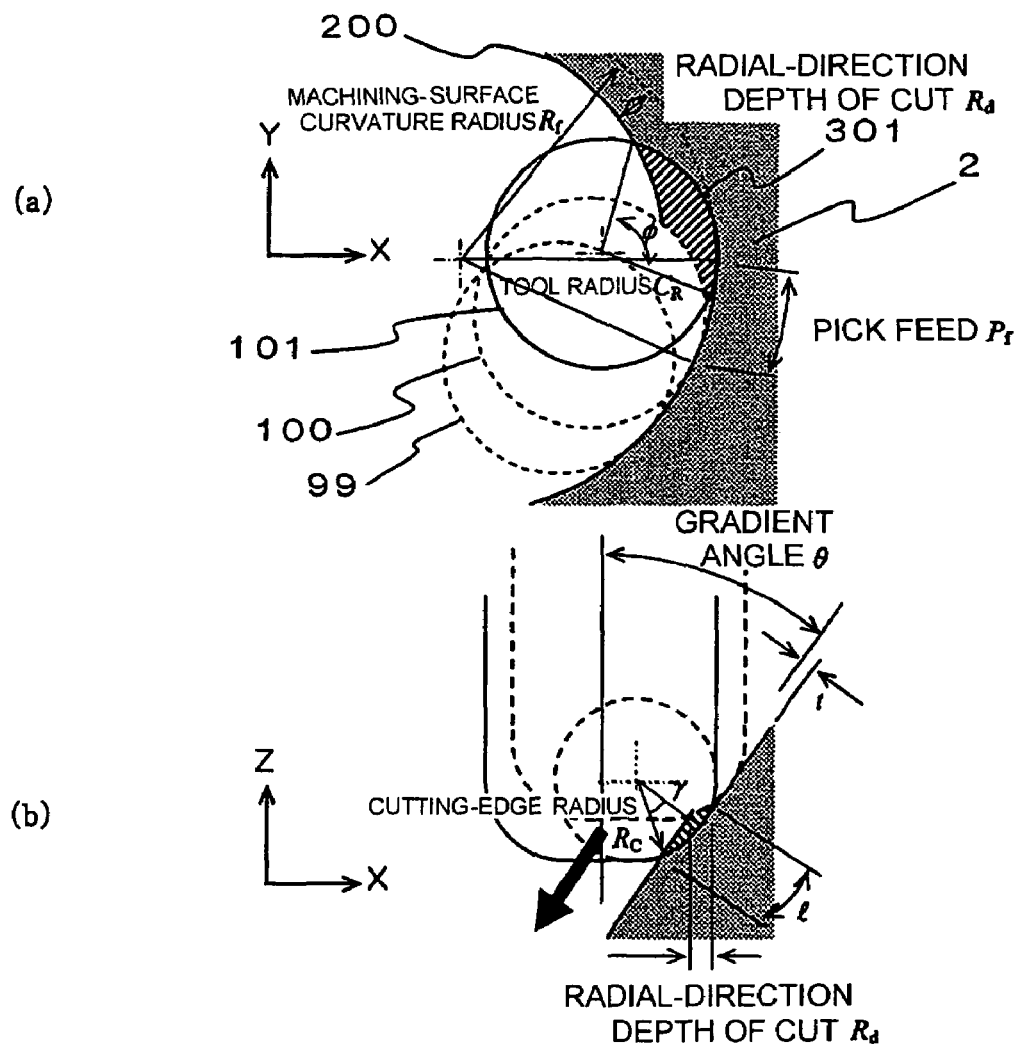
FIGS. 3(A) and 3(B) are a set of explanatory charts for explaining the contact angle, of the cutting edge of a cutting tool, with respect to a gradient face having an arbitrary curvature and/or radial-direction depth of cut of the cutting tool, in the case where pick feed is carried out on the gradient face.

FIG. 3 is a set of charts representing the relationships among the tool radius in the tool rotation plane, the curvature radius of a machining surface, the radial-direction depth of cut, the pick feed, and the milling cross section; and the milling cross section in a plane including the tool rotation axis and the tool transport direction in FIG. 1. The rotation axis of a tool 1 is inclined by a gradient angle $\theta$ with respect to the machining surface.

In FIG. 3, in order to evaluate the stability to the self-excited vibration of the tool 1, an angle $\phi_{st}$ at which the cutting edge of the tool rotatingly starts milling and an angle $\phi_{ex}$ at which the cutting edge ends the milling are required. In FIG. 3, the shape of a cutting cross section 301 is determined by an envelope 101 along which, at the present position of the tool 1, the cutting edge rotates, an envelope 100 along which, at the one-pick-feed previous position of the tool 1, the cutting edge rotates, and a face contour 200 of a workpiece 2 at the moment prior to a series of machining steps.

Accordingly, the cutting start angle $\phi_{st}$ and the cutting end angle $\phi_{ex}$ are determined by a tool radius $C_R$, a radial-direction milling Rd, a machining-surface curvature radius $R_f$, and a pick feed $P_f$. However, in FIG. 3, it is difficult to geometrically calculate $\phi_{st}$ and $\phi_{ex}$; therefore, in the present example, the calculation is performed in accordance with the method described below.

Figure 4:
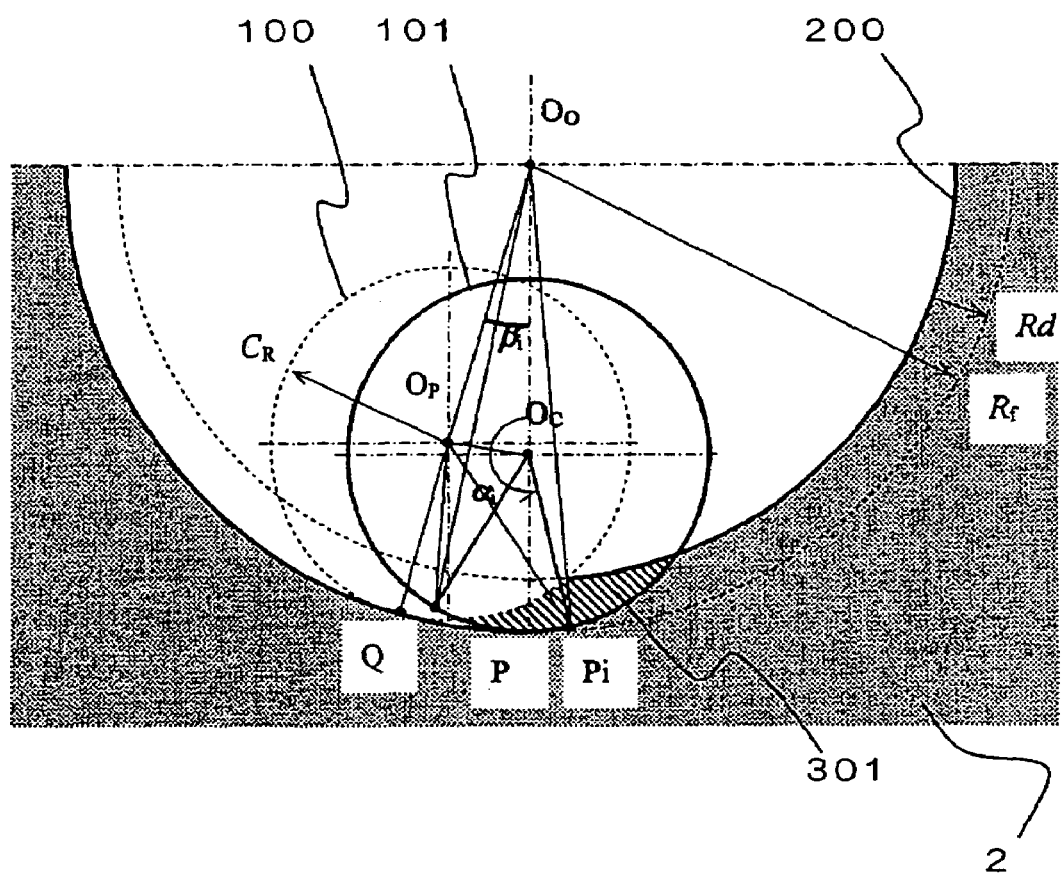
FIG. 4 is an explanatory chart for representing the relationship, on a machining surface having a curvature, between the contact angle of the cutting edge of a cutting tool and a machining condition.

FIG. 4 is a chart representing a milling cross section in the tool rotation plane. Let Oc denote the present rotation center of the tool 1; it is assumed that Oc is the origin of the X-Y coordinates. Supposing that, with regard to the envelope 101 along which, at the present position of the tool 1, the cutting edge rotates, the direction of a line that connects the present rotation center of the tool 1 and the machining-surface curvature center Oo is defined to the Y direction, the coordinates $(x_o, y_o)$ of the machining surface curvature center Oo are given by Equations (1) and (2) below:

$$x_o = 0 \qquad (1)$$

$$y_o = R_f - C_R \qquad (2)$$

In addition, in the milling path prior to the immediately previous pick feed, the region represented by the envelope of an arc 100 has been milled. The center position and the radius of the arc 100 are indicated by Op and $C_R$, respectively. Let Q and P denote the point, at which a line that connects the machining-surface curvature center Oo with the center position Op of the arc 100 and the machining surface intersect each other, and the point, at which a line that connects the machining-surface curvature center Oo with the tool center point Oc and the machining surface intersect each other, respectively. In this situation, $\beta$ when the angle $\angle QOoP$ is given by Equation (3) below:

[Formula 1]

$$\beta = \frac{P_f}{R_f} \qquad (3)$$

where $P_f$ and $R_f$ denote a pick feed along the machining surface and the machining-surface curvature radius, respectively.

Thus, the coordinates $(x_p, y_p)$ of the center Op of the arc 100 are given by Equations (4) and (5) below:

$$x_p = (R_f - C_R) \cdot \sin\beta \qquad (4)$$

$$y_p = (R_f - C_R) \cdot (1 - \cos\beta) \qquad (5)$$

Meanwhile, the envelope 101 along which, at the present position of the tool 1, the tool cutting edge rotates is an arc whose center is the origin Oc of the X-Y coordinate system and whose radius is $C_R$; therefore, the point Pi $(x_i, y_i)$ on the envelope 101 is represented by Equations (6) and (7) below:

$$x_i = -C_R \cdot \sin\alpha_i \qquad (6)$$

$$y_i = C_R \cdot \cos\alpha_i \qquad (7)$$

where $\alpha_i$ denotes the (counterclockwise) angle, of the point Pi on the envelope 101, from the Y-axis direction in FIG. 4.

The condition that the point Pi on the envelope 101 is within the cutting area 301 is defined as follows:

(1) The point Pi is outside the arc 200; and
(2) The point Pi is outside the arc 100

By utilizing the coordinates of the point obtained, based on the machining condition, in accordance with the foregoing equations, it can be determined that, when both Equations (8) and (9) below are satisfied, the point Pi is within the milling region 301.

$$(1)\ OoPi \geq R_f - R_d \qquad (8)$$

$$(2)\ OoPi \geq C_R \qquad (9)$$

When NC data for machining a three-dimensional curved surface or the like is created, the depth of cut is given mostly by depth of cut in the direction perpendicular to the machining surface. The tool radial-direction depth of cut $R_d$ is given by depth of cut t in the direction perpendicular to the machining surface and the gradient angle $\theta$ between the tool rotation axis and the machining surface.

Accordingly, in FIG. 3, the tool radial-direction depth of cut Rd is given by Equation (10) below:

$$R_d = t \cdot \cos\theta \quad (10)$$

In the present example, while the point Pi on the arc 101 is shifted in such a way that the angle $\alpha_i$ thereof from the Y axis is varied in steps of $\Delta\alpha$, in the case where the foregoing condition is satisfied, g is set to 1, and in the case where the foregoing condition is not satisfied, g is set to 0; by varying $\alpha_i$ from 0 to $2\pi$ (rad), whether or not the point Pi is within the milling region 301 is determined. Then, the first $\alpha_i$, at which the point Pi comes into the milling region 301, and the last $\alpha_i$, at which the point Pi goes out of the milling region 301, are regarded as the angles $\phi_{st}$ and $\phi_e$, respectively.

Figure 6:
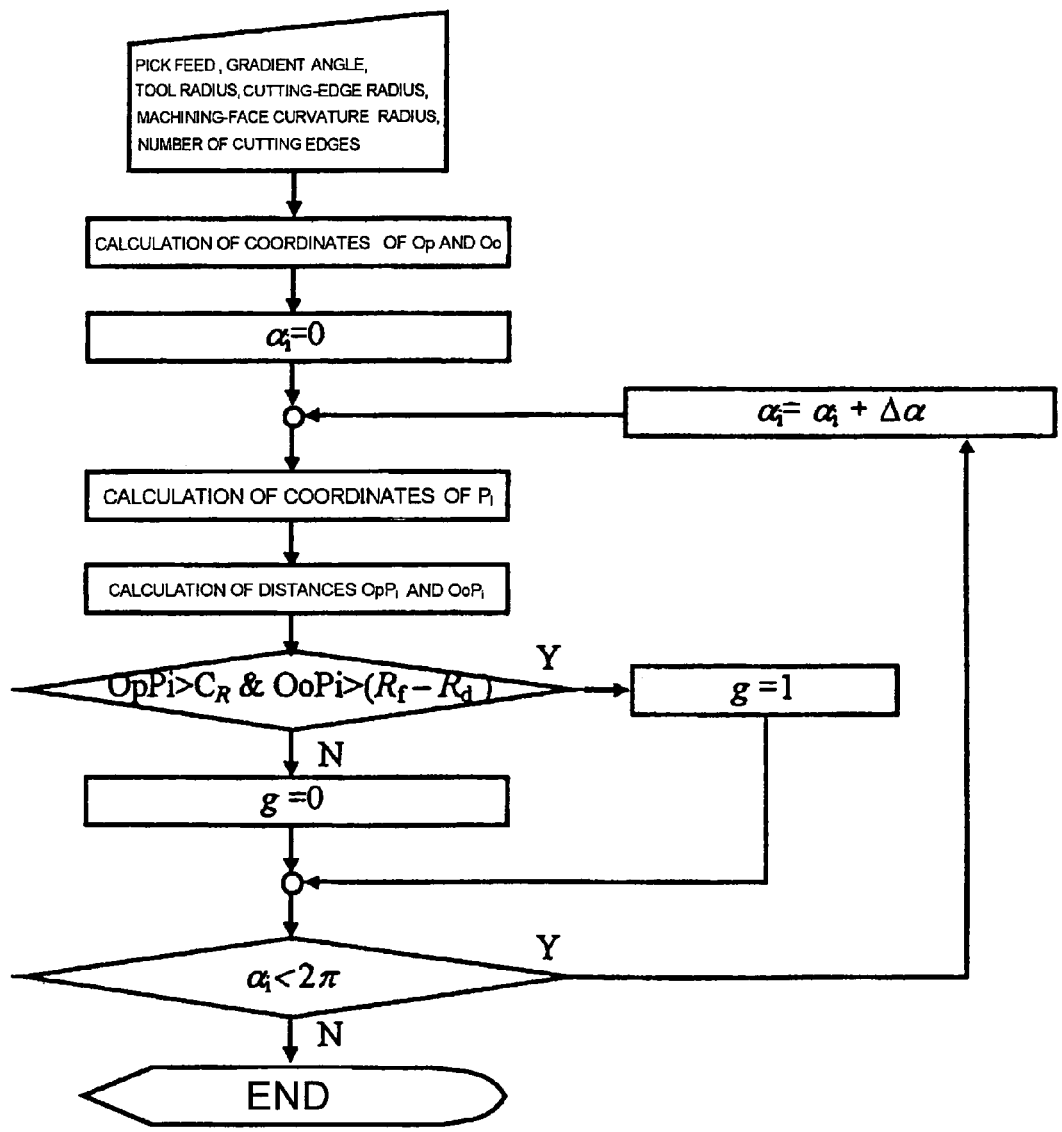
FIG. 6 is an explanatory flowchart for illustrating a method, according to the present invention, for calculating the contact angle of the cutting edge of a cutting tool.

A method is illustrated in FIG. 6 in which the angles $\phi_{st}$ and $\phi_{ex}$ are obtained, in accordance with the forgoing method and by utilizing the tool radius $C_R$, the radial-direction depth of cut $R_d$, the machining surface curvature radius $R_f$, the pick feed $P_f$, and the like.

In FIG. 6, the pick feed $P_f$, the gradient angle $\alpha_i$, the tool radius $C_R$, the cutting edge R, the machining surface curvature radius $R_f$, and the number N of cutting edges are inputted so as to calculate the coordinates of Op and the coordinates of Oo. Subsequently, in the first place, with $\alpha_i$ set to zero, the coordinates of Pi is calculated, and then the distances OpPi and OoPi are calculated. Whether or not the condition that OpPi is larger than $C_R$ and OoPi is larger than $(R_f - R_d)$ is satisfied is determined; if satisfied, g is set to 1, and if not, g is set to 0. Next, whether or not the condition that $\alpha_i$ is smaller than $2\pi$ is satisfied is determined; if satisfied, $\alpha_i$ is set to $\alpha_i + \alpha\Delta$, and then the calculation from and after the calculation of the coordinates of Pi is resumed. If not satisfied, it implies that all the calculations have been completed; thus, the procedure for obtaining the angles $\phi_{st}$ and $\phi_{ex}$ ends.

As described above, the first $\alpha_i$ at which g becomes 1 and a specific $\alpha_i$ (the last $\alpha_i$ at which g is 1) that is one-step prior to the $\alpha_i$ at which g becomes 0 can be obtained, whereby the angles $\phi_{st}$ and $\phi_{ex}$ can be obtained.

Figure 9:
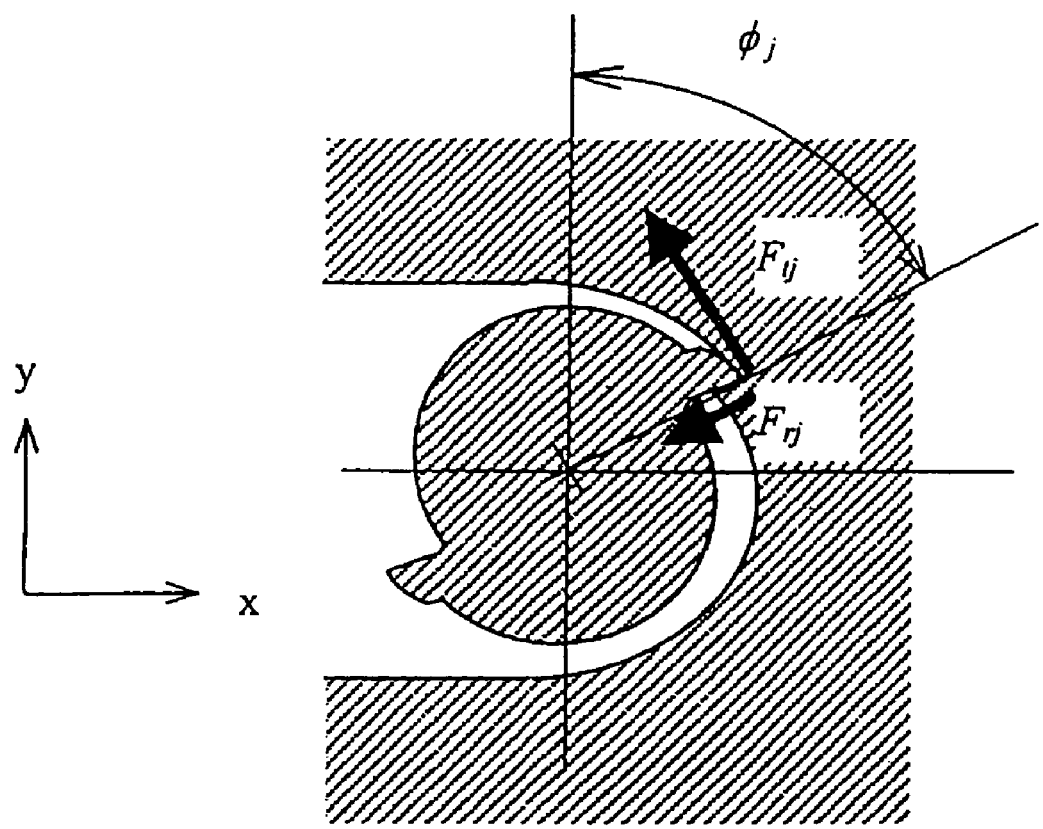
FIG. 9 is an explanatory chart for explaining milling force that acts on a cutting tool during milling processing.

Next, tangential-direction milling force $F_{tj}$ and radial-direction milling force $F_{rj}$ that act on the j-th cutting edge illustrated in FIG. 9 are given by Equations (11) and (12), respectively.

$$F_{tj} = K_t \cdot l \cdot h(\phi_j) \quad (11)$$

$$F_{rj} = K_r \cdot F_{tj} \quad (12)$$

where $F_{tj}$ and $F_{rj}$ have a positive value, and the direction of the milling force received by the cutting edge is as indicated by the arrows in FIG. 9. $K_t$ and $K_r$, obtained through an experiment, have a value determined by the work material, the cutting edge shape, and the like. The symbol "l" is the length of the cutting edge.

The tangential-direction milling force $F_{tj}$ and the radial-direction milling force $F_{rj}$ are transformed along the x-axis and the y-axis, so that Equations (13) and (14) below are yielded. In addition, $F_{xj}$ and $F_{yj}$ have a positive value when they are forces in the respective positive directions along the x-axis and the y-axis.

$$F_{xj} = -F_{tj} \cos\phi_j - F_{rj} \sin\phi_j \quad (13)$$

$$F_{yj} = F_{tj} \sin\phi_j - F_{rj} \cos\phi_j \quad (14)$$

Next, if the number of the cutting edges is N, forces $F_x$ and $F_y$ that act on the tool are given by Equations (15) and (16), respectively:

[Formula 2]

$$F_x = \sum_{j=0}^{N-1} F_{xj} \quad (15)$$

[Formula 3]

$$F_y = \sum_{j=0}^{N-1} F_{yj} \quad (16)$$

Equation (15) and (16) are represented in matrix forms, so that Equation (17) below is yielded:

[Formula 4]

$$\begin{aligned}
\begin{bmatrix} F_x \\ F_y \end{bmatrix} &= \sum_{j=0}^{N-1} \begin{bmatrix} F_{xj} \\ F_{yj} \end{bmatrix} \\
&= \sum_{j=0}^{N-1} \begin{bmatrix} -\cos\phi_j & -\sin\phi_j \\ -\sin\phi_j & -\cos\phi_j \end{bmatrix} \begin{bmatrix} F_{tj} \\ F_{rj} \end{bmatrix} \\
&= \sum_{j=0}^{N-1} \begin{bmatrix} -\cos\phi_j & -\sin\phi_j \\ -\sin\phi_j & -\cos\phi_j \end{bmatrix} Kt \cdot l \cdot \begin{bmatrix} 1 \\ Kr \end{bmatrix} \cdot \\
&\quad g(\phi_j) \cdot [\sin\phi_j \ \cos\phi_j] \begin{bmatrix} \Delta x \\ \Delta y \end{bmatrix} \\
&= l \cdot Kt \cdot \sum_{j=0}^{N-1} g(\phi_j) \cdot \begin{bmatrix} -\cos\phi_j & -\sin\phi_j \\ -\sin\phi_j & -\cos\phi_j \end{bmatrix} \\
&\quad \begin{bmatrix} \sin\phi_j & \cos\phi_j \\ Kr\sin\phi_j & Kr\cos\phi_j \end{bmatrix} \cdot \begin{bmatrix} \Delta x \\ \Delta y \end{bmatrix} \\
&= l \cdot Kt \cdot \sum_{j=0}^{N-1} g(\phi_j) \cdot \\
&\quad \begin{bmatrix} -\sin\phi_j\cos\phi_j - Kr\sin^2\phi_j & -\cos^2\phi_j - Kr\sin\phi_j\cos\phi_j \\ \sin^2\phi_j - Kr\sin\phi_j\cos\phi_j & \sin\phi_j\cos\phi_j - Kr\cos^2\phi_j \end{bmatrix} \begin{bmatrix} \Delta x \\ \Delta y \end{bmatrix}.
\end{aligned} \quad (17)$$

Here, supposing that

[Formula 5]

$$a_{xx} = \sum_{j=0}^{N-1} -g(\phi_j)[\sin 2\phi_j + Kr(1 - \cos 2\phi_j)],$$

[Formula 6]

$$a_{xy} = \sum_{j=0}^{N-1} -g(\phi_j)[(1 + \cos 2\phi_j) + Kr\sin 2\phi_j],$$

[Formula 7]

$$a_{yx} = \sum_{j=0}^{N-1} g(\phi_j)[(1 - \cos 2\phi_j) - Kr\sin 2\phi_j], \text{ and}$$

[Formula 8]

$$a_{yy} = \sum_{j=0}^{N-1} g(\phi_j)[\sin 2\phi_j - Kr(1 + \cos 2\phi_j)],$$

Equation (17) is rearranged into Equation (18) below:

[Formula 9]

$$\begin{bmatrix} F_x \\ F_y \end{bmatrix} = \frac{1}{2} l \cdot Kt \cdot \begin{bmatrix} a_{xx} & a_{xy} \\ a_{yx} & a_{yy} \end{bmatrix} \begin{bmatrix} \Delta x \\ \Delta y \end{bmatrix} \quad (18)$$

Furthermore, supposing that

[Formula 10]

$$[A] = \begin{bmatrix} a_{xx} & a_{xy} \\ a_{yx} & a_{yy} \end{bmatrix},$$

Equation (18) is rearranged into the following equation:

[Formula 11]

$$\begin{bmatrix} F_x \\ F_y \end{bmatrix} = \frac{1}{2} l \cdot Kt \cdot [A] \begin{bmatrix} \Delta x \\ \Delta y \end{bmatrix}$$

Equation (18) is rearranged into Equation (19) below, by use of "time-average milling force"

[Formula 12]

$$\begin{bmatrix} F_x \\ F_y \end{bmatrix} = \frac{1}{2} l \cdot Kt \cdot [A_0] \begin{bmatrix} \Delta x \\ \Delta y \end{bmatrix} \quad (19)$$

In this regard, however, the time-average milling force is given Equation (20) below:

[Formula 13]

$$[A_0] = \frac{1}{T} \int_0^T [A] dt = \frac{1}{2\pi/N} \int_{\phi_{st}}^{\psi_{ex}} [A] d\phi \quad (20)$$

where T denotes the period of milling.

Heretofore, the displacement of the tool and the fluctuation component of milling force that acts on the tool are associated with each other.

Next, the open-loop transfer function for a vibration system, which consists of a tool and a workpiece and feeds back the one-period previous cutting edge vibration to the present milling thickness by the principle of reproduction effect, is given by Equation (21) below:

[Formula 14]

$$F(i\omega) = \frac{1}{2} l \cdot Kt (1 - e^{i\omega T})[A_0][\Phi(i\omega)] \cdot F(i\omega) \quad (21)$$

where $[\Phi(i\omega)]$ denotes a transfer function with regard to the force that acts on the tool and the workpiece and the relative displacement.

The above characteristic equation is rearranged into Equation (22) below:

[Formula 15]

$$\det\left[[I] - \frac{1}{2} Kt \cdot l \cdot (1 - e^{-i\omega T})[A_0][\Phi(i\omega)]\right] = 0 \quad (22)$$

Equation (19) is rearranged into Equation (25) by use of Equations (23) and (24).

[Formula 16]

$$[\phi_0] = [A_0][\Phi(i\omega)] \quad (23)$$

[Formula 17]

$$\Lambda = -\frac{1}{2} l \cdot Kt(1 - e^{-i\omega T}) \quad (24)$$

[Formula 18]

$$\det[[I] + \Lambda[\Phi_0(i\omega)]] = 0 \quad (25)$$

Here, $\Lambda$ can be obtained though eigenvalue analysis of the matrix $[\Phi_0(i\omega)]$ in Equation (25). Subsequently, from Equation (24), the stability-limit depth of cut l can be calculated.

By transforming the milling period T into the tool rotation speed S, at each stability-limit depth of cut l that satisfies the above equations when the inherent vibration frequency ω of the mechanical system is varied, a stability-limit curve can be obtained. The foregoing operation is performed for integer-fold vibration frequencies of inherent vibration frequency ω, i.e., for all the harmonics.

Meanwhile, in FIG. 3 in the case where the cutting edge radius $R_c$ and the machining surface-perpendicular depth of cut t are given, the cutting-edge contacting length l is substantially given by Equation (26) below when the cutting edge radius is larger than the feed distance of the cutting edge of the tool.

$$l = R_c \cdot \gamma \quad (26)$$

Here, from the geometrical relationship in FIG. 3, γ is given by Equation (27):

[Formula 19]

$$\gamma = \cos^{-1}\left(1 - \frac{t}{R_C}\right) \quad (27)$$

The foregoing anticipation of milling self-excited vibration is to obtain a limit cutting-edge contacting length l with which no self-excited vibration is caused, with the tool radial-direction depth of cut $R_d$, the tool radius, the number of cutting edges, and the like given as input values.

However, the objective of the present invention is to obtain the limit machining surface-perpendicular depth of cut t with which no self-excited vibration is caused. Accordingly, in the foregoing method for obtaining a stability-limit depth of cut, the radial-direction depth of cut $R_d$ is required to be known, as represented in Equation (8), when the angle $\phi_{st}$ at which the cutting edge starts cutting is obtained, i.e., the machining-surface-perpendicular depth of cut t to be obtained is required to be known, as represented in Equations (26) and (27).

Therefore, in the present invention, as the machining-surface-perpendicular depth of cut t, an arbitrary initial value is given; based on the initial value, the stability-limit cutting-edge contacting length l is obtained; and from the relational equations (26) and (27), the stability-limit machining-surface-perpendicular depth of cut $t_{lim}$ is obtained. Subsequently, the calculation is repeated with the initial value being varied, until the discrepancy between the initially given machining-surface-perpendicular depth of cut t and the present given machining-surface-perpendicular depth of cut is eliminated.

Figure 7:
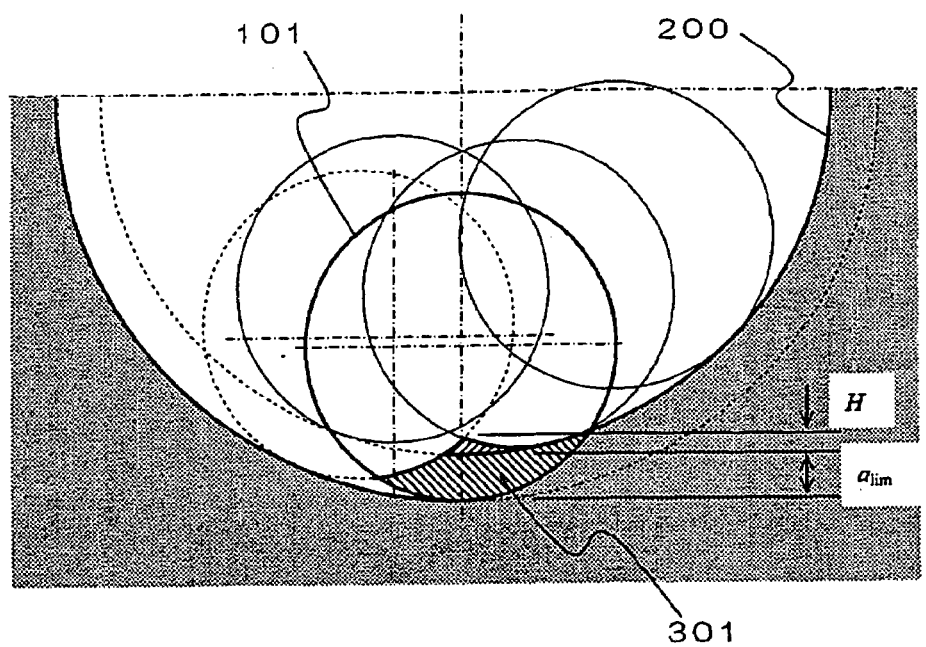
FIG. 7 is an explanatory chart for explaining the effect, on a depth of cut, of a scallop height caused by a pick feed.

Additionally, as represented in FIG. 7, when milling is performed while the pick feed is being kept, an uncut portion of height H, referred to as "scallop height", is left on the immediately previous machining surface 200. The uncut portion has an effect to increase the depth of cut in the present milling. The scallop height H is given by Equation (28) below, by use of the pick feed $P_f$ and the tool radius $C_R$.

[Formula 20]

$$H = \frac{P_f^2}{8C_R} \quad (28)$$

Thus, in the foregoing processing, it is required that no discrepancy exists between the addition of the initial value t of the machining-surface-perpendicular depth of cut and the scallop height H and the calculated stability-limit depth of cut $t_{lim}$.

Figure 5:
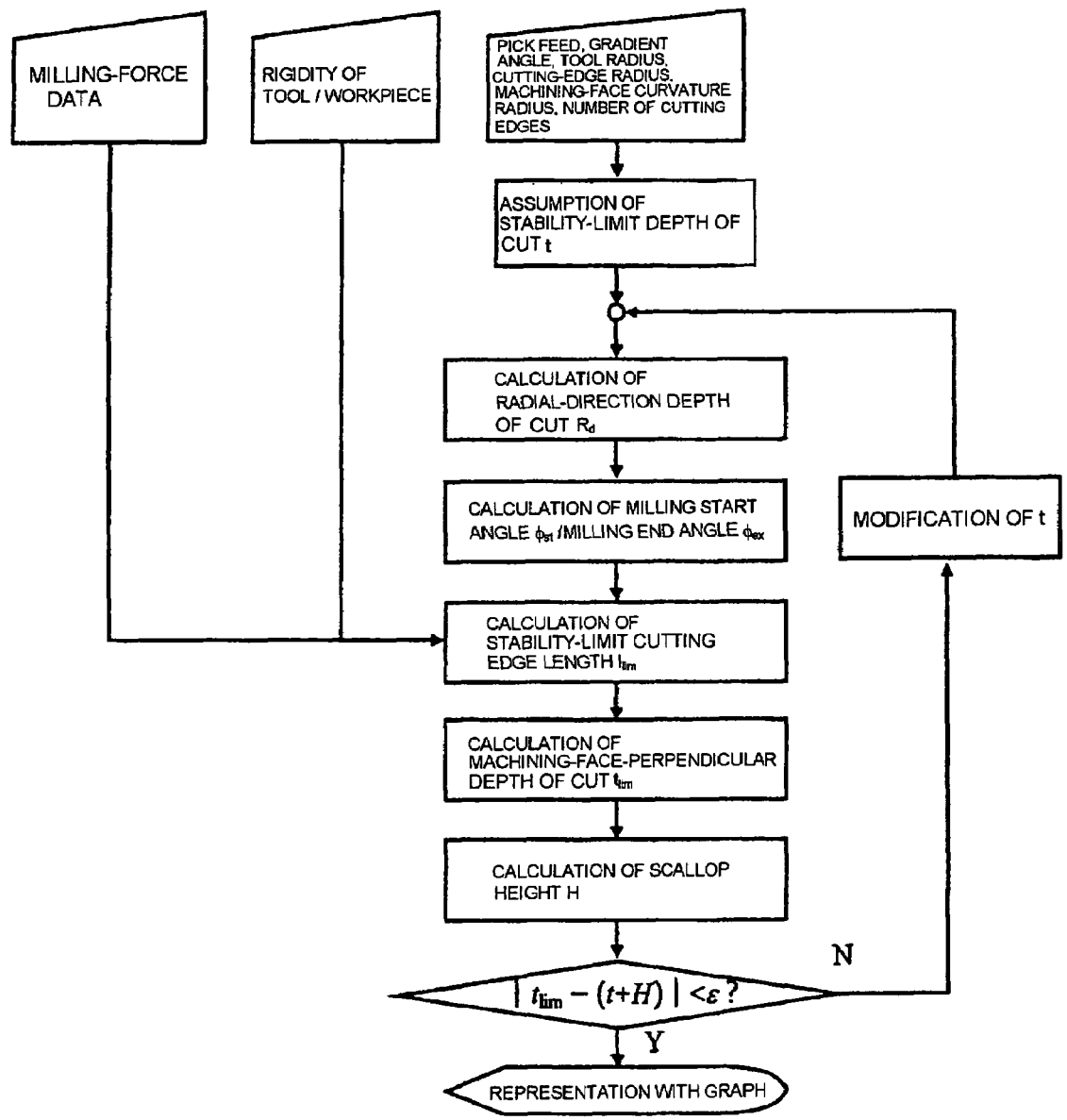
FIG. 5 is an explanatory flowchart for illustrating a flow for calculation processing according to the present invention.
Figure 8:
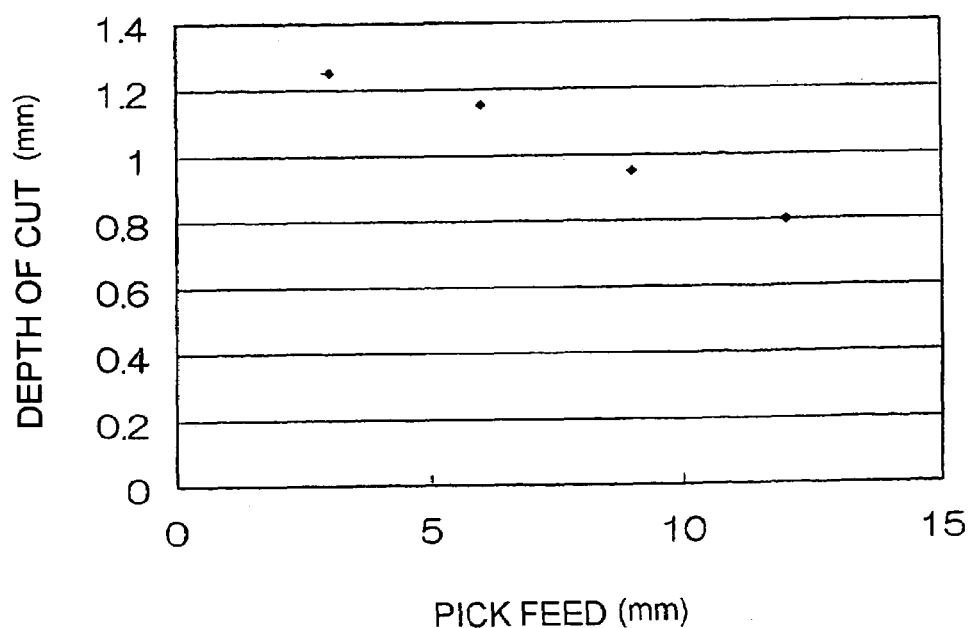
FIG. 8 is an explanatory graph for explaining an example of the results of a calculation according to the present invention.

FIG. 5 is a flowchart collectively illustrating all the foregoing processing steps. For example, the calculation is performed with the value of the pick feed $P_f$ varied variously, so that the calculation results are outputted as the graph represented in FIG. 8.

In FIG. 5, the pick feed $P_f$, the gradient angle $\alpha_i$, the tool radius $C_R$, the cutting edge radius $R_c$, the machining-surface curvature radius $R_f$, and the number N of cutting edges are inputted so as to assume the stability-limit depth of cut t. The radial-direction depth of cut $R_d$ is calculated. Next, the cutting start angle $\phi_{st}$ and the cutting end angle $\phi_{ex}$ are calculated. The stability-limit cutting-edge length $l_{lim}$ is calculated by use of the cutting-force data and the tool/workpiece dynamic rigidity. The machining-surface-perpendicular depth of cut $t_{lim}$ is calculated. The scallop height H is calculated. Whether or not $|t_{lim}-(t+H)| < \epsilon$ ($\epsilon$, which is a constant value, denotes a tolerance range or the like) is satisfied is determined; if not, t is modified and the calculation from and after that for the radial-direction depth of cut $R_d$ is resumed. If satisfied, the machining-surface-perpendicular depth of cut $t_{lim}$ is represented by a graph. As described heretofore, the machining-surface-perpendicular depth of cut $t_{lim}$ can be obtained.

The method described heretofore makes it possible to anticipate through calculation the stability limit for a milling self-excited vibration in the case where a gradient face, which has a curvature in the tool rotation plane, is machined with the tool transported in the rotation-axis direction of the tool; therefore, by preliminarily anticipating the stable depth of cut with which no self-excited vibration is caused, the number of man-hours required for creation and modification of NC data can be reduced.

By creating NC data with depth of cut that is larger than a conventional depth of cut, machining conditions that do not cause self-excited vibration and are further more high-efficiency can be set. As a result, workpiece machining can efficiently be performed.

As explained in the foregoing example, according to Embodiment 1 of the present invention, in a method for calculating the maximum depth of cut that corresponds to the stability limit of a milling self-excited vibration, in consideration of machining conditions, the rigidity of a machining tool, the machinability of a material, and the like, the initial value for the machining-surface-perpendicular depth of cut is firstly set, by utilizing as input values the machining-surface curvature radius, the tool radius, the pick feed, the gradient angle between the machining surface and the tool rotation axis, and the number of tool edges; based on the initial value, the milling start angle and the milling end angle for the cutting edge are obtained; the machining-surface-perpendicular depth of cut that causes no self-excited vibration is calculated; and the calculation is repeated while modifying the initial value until the difference between the initial value and the calculation result becomes the same as or smaller than a given value, so that the maximum depth of cut that corresponds to the stability limit of a milling self-excited vibration can be calculated.

Embodiment 2 of the present invention is a case in which, in the method, according to Embodiment 1, for calculating the maximum depth of cut without any milling self-excited vibration, the tool-edge radius is utilized as the input value.

According to Embodiment 3 of the present invention, in the case where, in the method, according to Embodiment 1, for calculating the maximum depth of cut without any milling self-excited vibration, the cutting start angle and the cutting end angle for the cutting edge are obtained, if the coordinates of a point on a trajectory, in the cutting edge rotation plane, that is drawn by the cutting edge is located not only outside the machining-surface arc produced through the operation immediately prior to a series of operational steps, but also outside the arc that is a cutting-edge trajectory in the immediately previous machining, it is determined that the point is being milled, and the cutting start angle and the cutting end angle can be obtained.

According to Embodiment 4 of the present invention, in the method, according to Embodiment 1, for calculating the maximum depth of cut without any milling self-excited vibration, the calculation is repeated while modifying the initial value for the machining surface-perpendicular depth of cut until the difference between the initial value and a value that is the addition of the scallop height determined by the pick feed and the tool radius and the result of calculation for stability-limit machining-surface-perpendicular depth of cut becomes the same as or smaller than a given value (or falls within an error range), so that the maximum depth of cut without any milling self-excited vibration is calculated.

According to Embodiment 5 of the present invention, in the method, according to Embodiment 1, for calculating the maximum depth of cut without any milling self-excited vibration, the relationship between the pick feed and the result of calculation for stability-limit machining-surface-perpendicular depth of cut is represented with a graph in which the X-axis and the Y-axis denote the pick feed and the calculation result, respectively, so that the selection of the machining condition is facilitated.

Embodiment 6 of the present invention is a program, for calculating the maximum depth of cut without any milling self-excited vibration, that, in order to calculate the maximum depth of cut that corresponds to the stability limit of a milling self-excited vibration, in consideration of machining conditions, the rigidity of a machining tool, the machinability of a material, and the like, makes a computer function as means for setting an initial value for the machining-surface-perpendicular depth of cut; means for, based on the initial value, obtaining the cutting start angle and the cutting end angle for the cutting edge; means for calculating the machining-surface-perpendicular depth of cut that causes no self-excited vibration; and means for calculating the maximum depth of cut that corresponds to the stability limit of a milling self-excited vibration, by repeating the calculation while modifying the initial value until the difference between the initial value and the calculation result becomes the same as or smaller than a given value, with the machining surface curvature radius, the tool radius, the pick feed, the gradient angle between the machining surface and the tool rotation axis, and the number of tool edges utilized as input values.

According to the present invention, an initial value for the stability-limit machining-surface-perpendicular depth of cut is set; based on the machining-surface curvature radius, the pick feed, and the tool radius, the cutting start angle and the cutting end angle for the cutting tool are obtained so as to calculate the stability-limit depth of cut; and, until the difference between the initially assumed value and the calculation result falls within a given error range, modification of the assumed value is repeated, so that the stability-limit machining-surface-perpendicular depth of cut can be obtained through calculation.

As a result, for example, in the case where the corner portion of a deep pocket is machined by moving the tool in a direction approximately the same as the rotation axis of the tool, the stable depth of cut without any milling self-excited vibration can be set; therefore, the number of man-hours required for the creation and the modification of an NC program can be reduced.

While we have shown and described several embodiments in accordance with our invention, it should be understood that disclosed embodiments are susceptible of changes and modifications without departing from the scope of the invention. Therefore, we do not intend to and be bound by the details shown and described herein but intend to cover all such changes and modifications a fall within the ambit of the appended claims.

We claim:

1. A method for creating a Numerical Control Program (NC Program) in consideration of a machining condition, the rigidity of a machining tool, the machinability of a material, the method comprising:
   setting firstly an initial value for the machining-surface-perpendicular depth of cut, by utilizing as input values the curvature radius of a machining surface, a tool radius, a pick feed, the gradient angle between the machining surface and a rotation axis of the tool, and the number of tool edges;
   obtaining a milling start angle and a milling end angle for a cutting edge, based on the initial value;
   calculating machining-surface-perpendicular depth of cut that causes no self-excited vibration;
   calculating maximum depth of cut that corresponds to the stability limit of a milling self-excited vibration, by repeating the calculation while modifying the initial value until the difference between the initial value and the calculation result becomes the same as or smaller than a given value; and
   utilizing the maximum depth of cut as a parameter of the NC Program.

2. The method according to claim 1, wherein a cutting edge radius of the tool is utilized as the input value.

3. The method according to claim 1, wherein, in obtaining the milling start angle and the milling end angle for the cutting edge, in the case where the coordinates of a point on a trajectory, in the cutting-edge rotation plane, that is drawn by the cutting edge is located not only outside a machining-surface arc produced through the operation immediately prior to a series of operational steps, but also outside the arc that is a cutting-edge trajectory in the immediately previous machining, it is determined that the point is being milled, and the cutting start angle and the cutting end angle are obtained.

4. The method according to claim 1, wherein the calculation is repeated while modifying the initial value for the machining-surface-perpendicular depth of cut until the difference between the initial value and a value that is the addition of the scallop height determined by the pick feed and the tool radius and the result of the calculation for stability-limit machining-surface-perpendicular depth of cut becomes the same as or smaller than a given value.

5. The method according to claim 1, wherein the relationship between the pick feed and the result of the calculation for stability-limit machining-surface-perpendicular depth of cut is represented with a graph in which the X-axis and the Y-axis denote the pick feed and the calculation result, respectively, and then a machining condition is selected.

6. A computer-readable storage medium component embodying a program, the program for calculating a maximal depth of cut that corresponds to a stability limit of a milling self-excited vibration, in consideration of a machining condition, the rigidity of a machining tool, the machinability of a material, the program effecting: means for firstly setting an initial value for the machining-surface-perpendicular depth of cut, by utilizing as input values the curvature radius of a machining surface, a tool radius, a pick feed, the gradient angle between the machining surface and a rotation axis of the tool, and the number of tool edges; means for, based on the initial value, obtaining a milling start angle and a milling end angle for a cutting edge; means for calculating machining-surface-perpendicular depth of cut that causes no self-excited vibration; and means for calculating the maximal depth of cut that corresponds to the stability limit of a milling self-excited vibration, by repeating the calculation while modifying the initial value until the difference between the initial value and the calculation result becomes a given value or smaller, the maximum depth of cut being utilized a parameter of a milling operation.

* * * * *